Sept. 23, 1969  F. T. THOMPSON ET AL  3,469,082
PHASE MEASURING SYSTEM FOR ELECTRIC POWER NETWORKS
Filed April 29, 1966  3 Sheets-Sheet 2

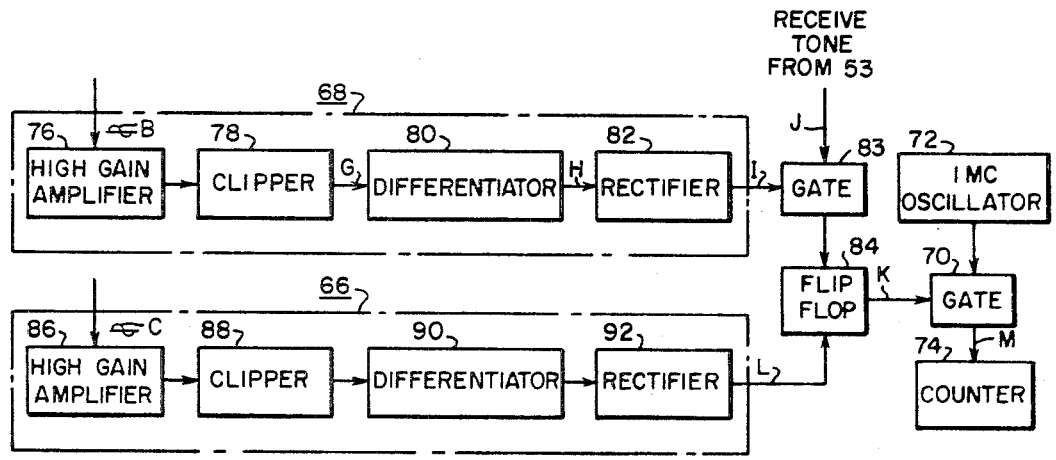
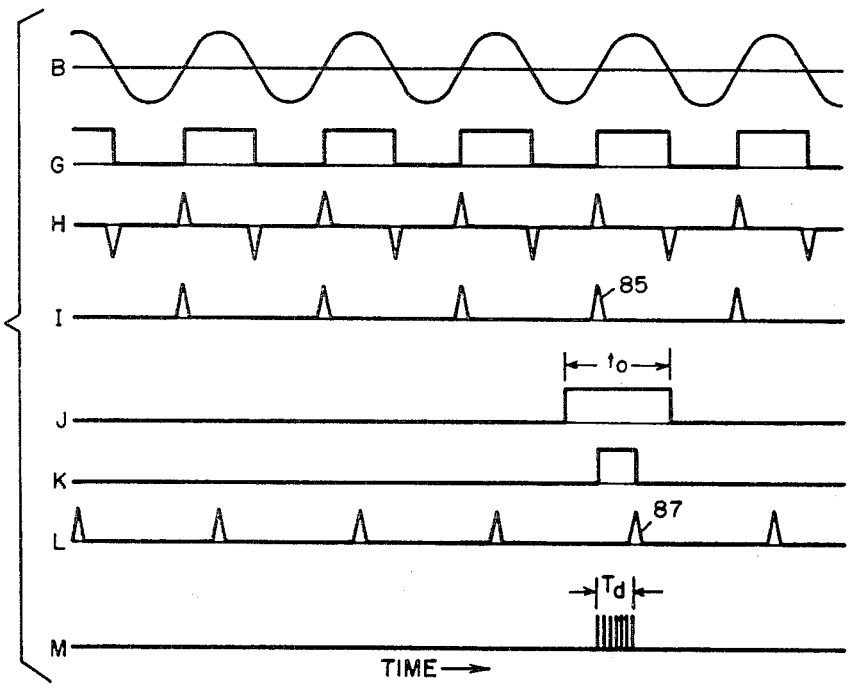

United States Patent Office 3,469,082
Patented Sept. 23, 1969

3,469,082
PHASE MEASURING SYSTEM FOR ELECTRIC POWER NETWORKS
Francis T. Thompson, Penn Hills, Verona, and Andre Wavre, Wilkinsburg, Pa., assignors to Westinghouse Electric Corporation, Pittsburgh, Pa., a corporation of Pennsylvania
Filed Apr. 29, 1966, Ser. No. 546,231
Int. Cl. G06f 15/20; G06g 7/62
U.S. Cl. 235—151.31                     8 Claims

ABSTRACT OF THE DISCLOSURE

Described is a phase measuring system for electric power networks and the like to a phase measuring system of the type described wherein networks are measured and compared to in which the phase of the voltage at a central, master power station, and wherein phase shifts introduced into a monitoring tone signal by a transmission channel are compensated for and/or counteracted.

---

As is known, modern electric power transmission systems consist of complicated lattices of generator plants and consumers, all of which are interconnected such that power can be diverted from one station to others, and vice versa. In order to calculate the most economical pattern for generation and distribution of power in such a system, the phase angle difference between the alternating voltage waveforms at spaced stations in the network becomes important. The sign of the phase angle difference is an indication of the direction of power flow, and its magnitude is an indication of the amount of power flow. By determining the value of the relative phase angle at various points in the network, and with the knowledge of the reactance to resistance ratio of the transfer impedance, it is possible to compute and optimize the power transmission.

While some phase angle measuring systems exist which are suitable for phase angle dispatch of power in small networks, such systems generally assume that the signal propagation time between stations in the network is constant and known. This assumption limits the possible accuracy of the system as applied to larger transmission networks for the reason that in order to compute the phase of the two signals at spaced stations, a communication channel must be employed. The transmission of signals over a communication channel introduces a relatively large transmission time delay, particularly if the distances involved are great; and the time delay is variable in both microwave and ground-wire transmission channels due to changes in temperature and atmospheric conditions, changes in the equipment because of aging or repairs made, or a change in the path of the communication link. Thus, conventional phase angle measuring systems which assume a constant propagation time or transmission time delay are not suitable for phase angle dispatch of power in an electrical network if any reasonable degree of accuracy is to be expected.

Accordingly, as one object, the present invention seeks to provide means for determining the phase angle between alternating voltages of equal frequency at remote, spaced locations.

Another object of the invention is to provide a new and improved phase angle dispatch system for electrical power transmission networks wherein the zero crossing of the alternating voltage is compared at master and slave stations with a succeeding zero crossing of a tone signal at the respective stations to determine the phase angle difference between the two alternating current power signals.

A further object of the invention is to provide a phase angle dispatch system for electrical power transmission networks wherein phase shifts introduced in a monitoring tone signal by a transmission channel are compensated for and/or counteracted.

Still another object of the invention is to provide a system for measuring the difference in phase between alternating voltages at two spaced locations, wherein the difference in phase is represented as a digital output signal which can be used in a digital control computer for an electrical power transmission network, or for other uses.

In accordance with the invention, the time $T_\phi$, corresponding to the difference in phase angle, $\Phi$, between alternating voltages at master and slave stations in a lower distribution network is determined by means of a tone signal transmitted from the master station to the slave station and returned back to the master station. This is accomplished by providing means for producing a first electrical signal, $T_r$, the magnitude of which is proportional to the time period of a full number of complete cycles of the aforesaid tone signal, means for producing a second electrical signal, $T_m$, the magnitude of which is proportional to the time between consecutive one polarity slope crossings of the alternating voltage and a transmitted tone signal at the master station, means for producing a third electrical signal, $T_s$, the magnitude of which is proportional to the time between consecutive one polarity slope crossings of the alternating voltage and a received tone signal at said slave station, means for producing a fourth electrical signal, $\alpha T_p$, the magnitude of which is proportional to the propagation time of the tone signal from the master to the slave station, and computer means responsive to said first, second, third and fourth signals for determining the magnitude of the time, $T_\phi$, corresponding to the phase angle, $\Phi$, in accordance with the equation:

$$T_\phi = T_r + T_m - T_s + \alpha T_p$$

Preferably, the aforesaid computer means is of the digital type and the electrical signals $T_r$, $T_m$, $T_s$ and $\alpha T_p$ are also digital, the magnitudes of the respective signals being indicated by the number of pulses therein. However, the invention, in its broader aspects, contemplates both digital and analog systems. In this respect, the terminology in the claims which follow to the effect that the "magnitude" of a signal is proportional to a given quantity means any magnitude of an electrical signal which can be measured and applied to a computer.

The above and other objects and features of the invention will become apparent from the following detailed description taken in connection with the accompanying drawings which form a part of this specification, and in which:

FIGURE 1 is a schematic illustration of a power distribution network;

FIG. 2 comprises waveforms illustrating the overall operation of the present invention;

FIG. 4 is a detailed block diagram of the zero crossing detectors used in the system of FIG. 3; and FIG. 5 comprises waveforms illustrating the operation of the zero crossing detectors of FIG. 4.

Figure 1:
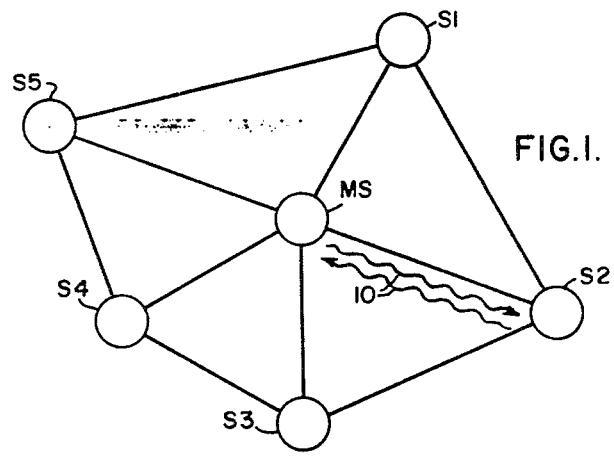

With reference now to the drawings, and particularly to FIG. 1, a power distribution network is schematically illustrated and includes a central or master station MS and five slave stations identified as S1 through S5. The master station MS, as well as the slave stations S1–S5, each have separate load circuits, not shown, and are interconnected such that power from station S3, for example, can be diverted to any one of the other stations in the network including the master station MS, and vice versa.

At the master station MS is a central computer which determines the most economical generation and dispatching of power for the system in order to minimize transmission losses. This can be determined from the phase angle difference between the alternating voltages at the master station MS and the various slave stations S1–S5. As was mentioned above, the sign of this phase angle difference between the master station and any one of the slave stations is an indication of the direction of power flow, and the magnitude of the phase angle difference is an indication of the amount of power flow. By determining the various phase angle differences, and by knowing the reactance to resistance ratio of the transfer impedance between stations, it is possible to compute and optimize power transmission.

The present invention is concerned with only one aspect of the computation of economical generation and dispatching of power, namely, determination of the phase angle between the alternating voltage at the master station and the various slave stations. For this purpose, the master station must be interconnected with each of the slave stations by means of two communication channels which may be either radio frequency, power line carrier, microwave, or telephone wire. Two such communication channels are schematically illustrated in FIG. 1 between the master station MS and the slave station S2 as microwave channels 10.

Figure 2:
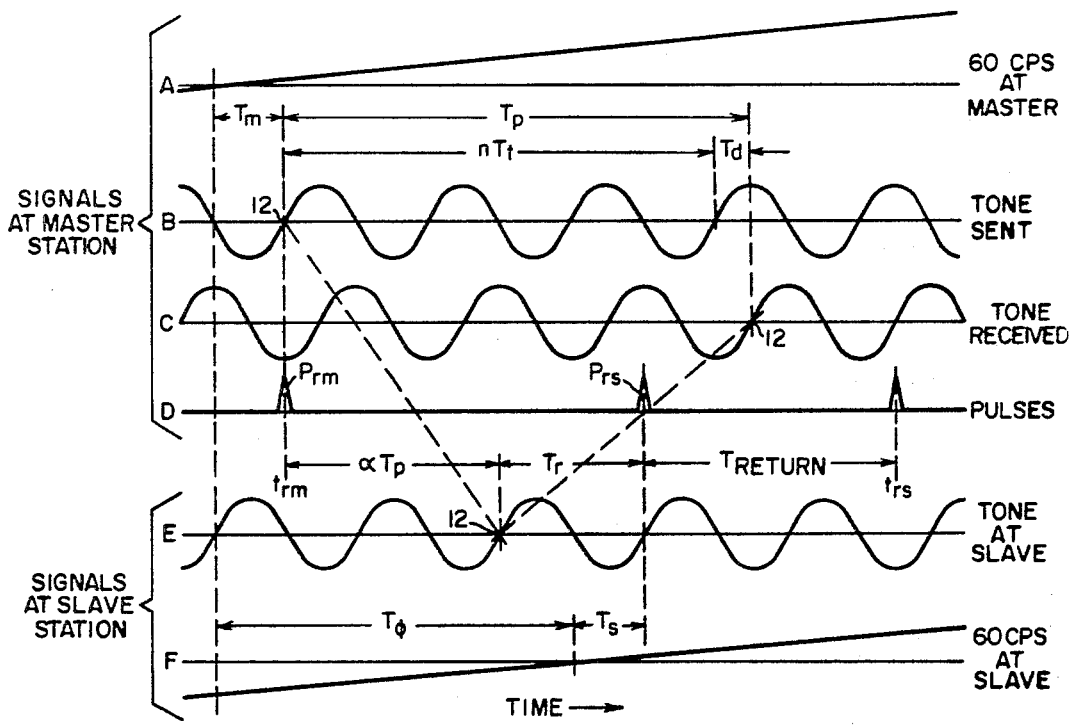

With reference now to FIG. 2, waveform A illustrates the positive slope zero crossing of the alternating voltage at master station MS; whereas waveform F illustrates the positive slope zero crossing of the 60-cycle alternating voltage at slave station S2. The function of the present invention, of course, is to determine the time, $T_\phi$, between the positive slope zero crossings of the two waveforms A and F. For this purpose, a tone signal, illustrated as waveform B in FIG. 2 and preferably having a frequency of about one kilocycle, is generated at the master station MS and sent over the communication channel 10 to the slave station S2. The transmitted tone, as received at the slave station S2, appears as waveform E in FIG. 2. The master station MS and slave station S2 may be separated by several hundred miles; and, therefore, there is a propagation delay time involved in transmitting the signal from station MS to station S2. As a result, the waveform E will be shifted in phase with respect to waveform B by the amount indicated in FIG. 2 as $\alpha T_P$. That is, this is the time required for the transmitted signal to travel from station MS to station S2; and it will be appreciated that point 12 in waveform B has now shifted to the right by the amount $\alpha T_P$. At the slave station S2, the waveform E is amplified and sent back to master station MS over the second communication channel 10, the total propagation time from the station MS to station S2 and back to station MS being identified in FIG. 2 as $T_p$. Consequently, the point 12 on the original waveform B, as received back at the master station MS (waveform C), has now been shifted or delayed by an amount equal to $T_p$, the total transmit-receive propagation time.

In waveform D of FIG. 2, the pulse $P_{rm}$ represents a pulse generated at the master station MS at the first positive slope zero crossing 12 of waveform B following the positive slope zero crossing of waveform A. This pulse, however, is not transmitted to the slave station S2. At the slave station S2, a pulse $P_{rs}$ is generated upon the first positive slope zero crossing of the received tone (waveform E) following the positive slope zero crossing of the 60-cycle power at station S2 (waveform F). This pulse, $P_{rs}$, is transmitted back to the master station MS, the propagation time for the return of the pulse $P_{rs}$ being identified in FIG. 2 as $T_{return}$.

As was mentioned above, the time, $T_\phi$, between consecutive positive slope zero crossings of the waveforms A and F is determined from the equation:

$$T_\phi = T_r + T_m - T_s + \alpha T_P$$

where:

$T_r$ is a reference time equal to a full number of tone periods and computed in a manner hereinafter described;

$T_m$ is the time between consecutive positive slope zero crossings of the waveforms A and B;

$T_s$ is the time between positive slope zero crossings of the waveforms F and E; and $\alpha T_p$ is the one-way tone propagation time between master station MS and slave station S2.

From FIG. 2, is can be seen that the total send-return propagation time, $T_p$, is equal to an integer number of tone periods included in the two-way transmission time (i.e., $nT_t$ where $T_t$ is the tone period), plus $T_d$. As shown, $T_d$ is the time between consecutive positive slope zero crossings of the tone sent by master station MS (waveform B) and the tone received back at the master station MS (waveform C). Since the total propagation time will not vary over more than one tone period, and since $T_t$ and $n$ can be determined, the total propagation time $T_t$ may be determined by measuring $T_d$ at the master station MS and adding it to $nT_t$.

The signal, after it arrives at station S2, must be amplified and then re-transmitted back to the master station MS; and in this process variable delays will be involved, depending upon the characteristics of the equipment at the station S2. The actual signal propagation time between the two stations MS and S2, however, can be assumed to be constant and, for example, may be 49% of the total propagation time $T_p$, the remaining 2% delay being in the terminal equipment at station S2. We can, therefore, assume that the time for propagation of the tone from the master station MS to the slave station S2 is a constant and known percentage $\alpha$. Therefore, by determining the total send-receive propagation time $T_p$ and by multiplying this amount by the known factor $\alpha$, the forward propagation time $\alpha T_p$ of the foregoing equation can be determined.

The factors $T_m$ and $T_s$ of the foregoing equation can be determined by measuring the difference in consecutive positive slope zero crossings of waveforms A and B and waveforms F and E at the master and slave stations, respectively. This leaves for determination the reference time $T_r$ which is a first approximation of time $T_\phi$ measured in number of tone periods, if the propagation time $T_p$ were zero. This measurement must be made in order to eliminate the inaccuracy introduced by the variable delay, $T_{return}$, of the synchronization pulse $P_{rs}$ sent from the slave station S2 to the master station MS. As was mentioned above, a pulse $P_{rm}$ is generated at the master station MS at the first positive slope zero crossing of waveform B following the positive slope zero crossing of waveform A. This pulse, however, is not sent to the slave station S2 but rather serves to enable a gate to feed pulses to a counter, which gate is disabled to stop the count when the pulse $P_{rs}$ is received back at the master station MS at time $t_{rs}$. The count of the aforesaid counter, therefore, is equal to:

$$\alpha T_p + T_r + T_{return}$$

The reference time $T_r$ can then be computed by subtracting from the aforesaid count the quantity $T_p$. Thus:

$$T_r = k(t_{rs} - t_{rm}) - (\alpha T_p + T_{return}) \simeq k(t_{rs} - t_{rm}) - T_p$$

where:

$k = +1$ if $t_{rm}$ occurs first and $K = -1$ if $t_{rs}$ is registered first

The value obtained by calculation for the reference time $T_r$ is then rounded out to the nearest full number of tone periods since, by definition, $T_r$ is a full number of tone periods. This eliminates the aforesaid inaccuracy of the time period, $T_{return}$, introduced by following the assumption that the total propagation time $T_p$ is equal to $\alpha T_p$ plus $T_{return}$.

Figure 3:
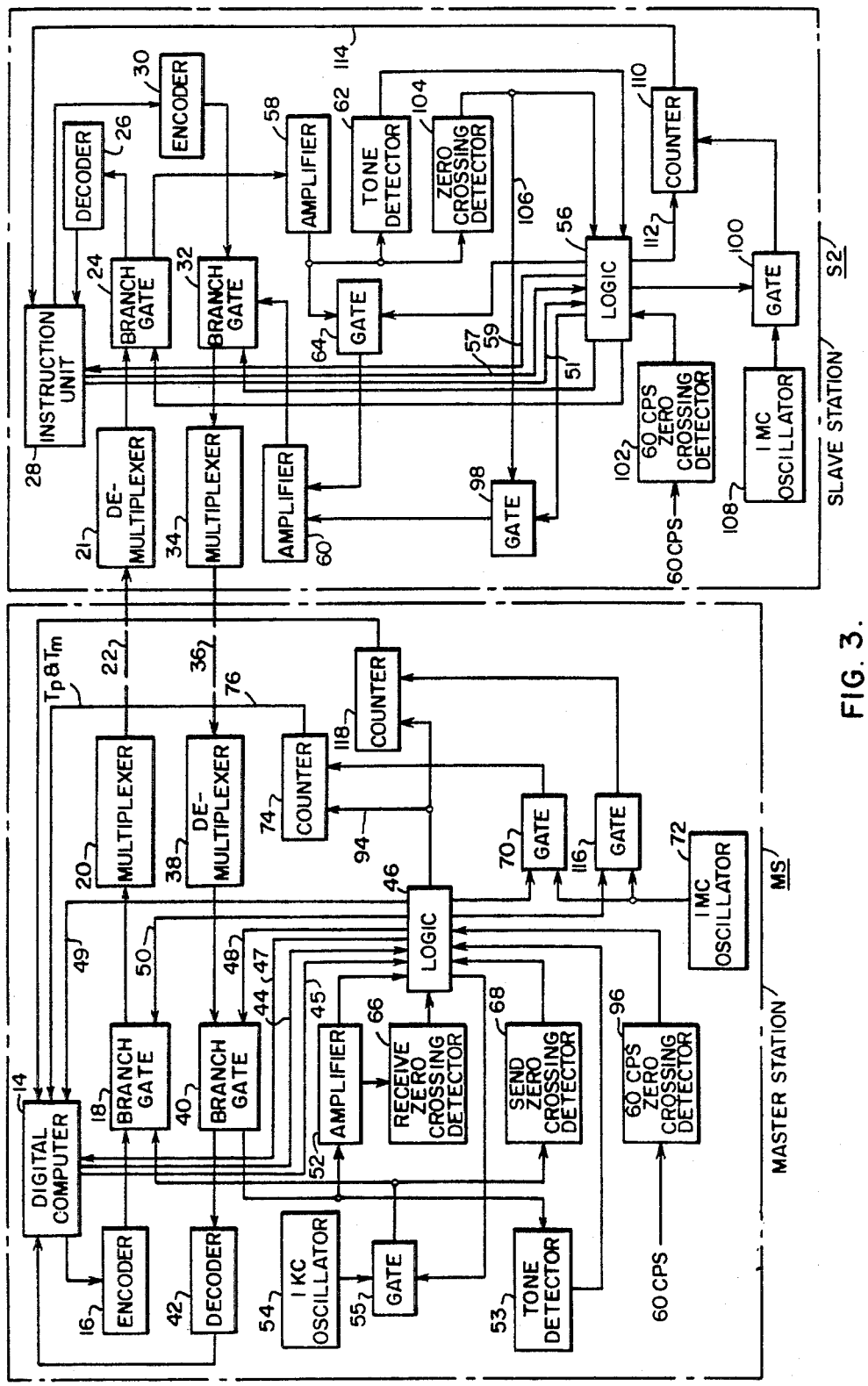
FIG. 3 is a block circuit diagram of one embodiment of a system for carrying out the invention.

A system for computing the phase angle $T_\phi$ is shown in FIG. 3. The master station MS includes a system digital computer 14 having an output channel connected through an encoder 16 and a branch gate 18 to a multiplexer 20. At the multiplexer 20, a subcarrier signal is modulated with intelligence signals from the digital computer 14; and a main carrier signal is, in turn, modulated with the subcarrier. The signal is then transmitted over channel 22 to a demultiplexer or demodulator 21 in the slave station S2 to recover the intelligence signal from the computer 14. This intelligence signal is then fed through a branch gate 24 and a decoder 26 to an instruction unit 28 in the station S2. The operation of the multiplexing equipment is fully described in the publication "Basic Carrier Telephony" by Tally, Hayden Book Company, Inc., New York, N.Y. 1960. Alternatively, reference may be had to U.S. Patent No. 2,907,874 for a full and detailed description of multiplexing and demultiplexing equipment.

Similarly, the signals from the instruction unit 28 are sent through an encoder 30 and branch gate 32 at the slave station S2 to a multiplexer 34 which transmits the signal over communication channel 36 to a demultiplexer or demodulator 38 at the master station MS. The recovered intelligence is then fed through a branch gate 40 and decoder 42 back to the digital computer 14.

Before the quantities $T_p$ or $T_r$, $T_m$ and $T_s$ can be determined, a communication link must be established between the master and slave stations. Accordingly, the first step in the process of determining $T_\phi$ is for the digital computer 14 to send a signal to the slave station along communication channel 22 to call the desired slave station. The instruction unit 28 in the slave station S2, after receiving the signal from computer 14, sends back a signal to the computer via communication channel 36 to tell the computer that the slave station is ready for the computation of $T_\phi$. During this time, the branch gates 18 and 40 are conditioned to connect the encoder 16 to the multiplexer 20 and the decoder 42 to the demultiplexer 38. Similarly, the branch gates 24 and 32 at slave station S2 are conditioned to connect the demultiplexer 21 to decoder 26 and multiplexer 34 to encoder 30.

DETERMINATION OF $T_p$

When communication is established between the master and slave stations, the computer sends an order to measure $T_p$. The slave station S2 answers for verification. After the aforesaid answering signal is sent back to the computer 14, a signal is sent by the computer via lead 44 to a logic circuit 46 which, through leads 48 and 50, causes the branch gate 40 to connect demultiplexer 38 to amplifier 52. It also causes branch gate 18 and gate 55 to connect the multiplexer 20 to the output of a one kilocycle oscillator 54. At the same time, it resets counter 74 via lead 94.

The instruction unit 28 in the slave station, after sending the aforesaid verification signal back to the computer 14, actuates a logic circuit 56 through lead 57. The logic circuit 56, in response to the signal from the instruction unit 28, causes branch gate 24 to connect the demultiplexer 21 to receive amplifier 58 instead of the decoder 26 and also causes the branch gate 32 to connect the multiplexer 34 to a transmit amplifier 60 instead of the encoder 30. At the same time, the logic circuit 56 causes gate 64 to connect receive amplifier 58 to send amplifier 60. These connections cause a one kilocycle tone signal from oscillator 54 to be sent over the communication channel 22 to the slave station S2 where it passes through demultiplexer 21 and branch gate 24 to amplifier 58. This signal, at slave station S2, corresponds to waveform E in FIG. 2. The received waveform E of FIG. 2 at slave station S2 passes through gate 64 and is amplified in amplifier 60 and sent back through the branch gate 32, multiplexer 34, and communication channel 36 to the master station MS.

At the master station MS, the received tone (waveform C in FIG. 2) passes through demultiplexer 38 and branch gate 40 to amplifier 52. When the received tone (waveform C in FIG. 2) arrives at the master station MS, it is sensed by a tone detector 53 which, through logic circuit 46, enables a pulse from send zero crossing detector 68 to gate circuit 70 "ON." A succeeding pulse from receive zero crossing detector 66 thereafter gates circuit 70 "OFF." Between the receipt of pulses from circuits 68 and 66, the gate 70 is open and pulses from a one megacycle oscillator 72 pass to counter 74 where they are counted to determine the time period $T_d$ shown in FIG. 2. Since the approximate number of tone periods is known in the total propagation time, the quantity $nT_t$ can be stored in the computer 14 and added to the output of counter 74 (i.e., $T_d$) to determine the total propagation time $T_p$.

The details of the zero crossing detectors 66 and 68 are shown in FIG. 4. Thus, circuit 68, for example, includes a high gain amplifier 76 to which waveform B of FIGS. 2 and 5 is applied. In amplifier 76, the amplitude of the sine wave is increased to the point where its slope at the zero crossing points is practically vertical. By passing this amplified waveform through a clipper 78, waveform G of FIG. 5 results which is a square waveform having leading and trailing edges coinciding with the zero crossing points of the original sine wave B. By differentiating the waveform G in differentiator 80, waveform H of FIG. 5 results wherein a spiked negative pulse is produced at each negative slope zero crossing of the original sine wave B; whereas a positive spiked pulse is produced at each positive slope zero crossing. By passing waveform H through rectifier 82, the negative spiked pulses of waveform H are eliminated, thereby producing waveform I of FIG. 5 wherein only the positive spiked pulses remain. Waveform I, in turn, is passed to a gate circuit 83 which, in effect, is part of the logic circuit 46.

The gate circuit 83 is normally disabled; however, upon receipt of the transmitted tone signal back at the master station MS, the tone detector 53 will produce an output to enable the gate 83. The output of the tone detector 53, therefore, may appear as waveform J of FIG. 5 wherein an output of increased voltage persists during the time $t_o$ in order to permit the quantity $T_d$ to be determined. Thus, once the gate 83 of FIG. 4 is enabled or opened upon receipt of the tone back at the master station MS, the next pulse in waveform I at the output of rectifier 82 (i.e., pulse 85 in FIG. 5), will cause flip-flop circuit 84 to switch from one stable state to the other, thereby producing a pulse in waveform K which enables or opens the gate 70 to pass pulses from oscillator 72 to the counter 74. These pulses are illustrated as waveform M in FIG. 5. Gate 70 will remain open until a positive pulse in waveform L (i.e., pulse 87 in FIG. 5) is received from zero crossing detector 66. As shown in FIG. 5, the detector 66 also includes an amplifier 86, a clipper 88, a differentiator 90 and a rectifier 92.

The first positive spiked pulse 87 in waveform L, following the positive pulse 85 in waveform I, shown in FIG. 2, switches flip-flop 84 back to its original stable state whereby the voltage in waveform K drops and the gate 70 is disabled. The number of pulses in waveform M between the occurrence of pulses 85 and 87 is, therefore, proportional to the time period $T_d$. This time period, in turn, is added to the known quantity $nT_t$ of FIG. 2 in computer 14.

When gate 70 is disabled or closes, the logic circuit 46 of FIG. 3 sends signals to gates 18, 40 and 55 to again connect encoder 16 to multiplexer 20, to connect decoder 42 to demultiplexer 38, and to disconnect the oscillator 54 from the remaining circuit components. At the same time it sends a completion signal via lead 47 to computer 14. When the computer 14 receives the aforesaid signal, it reads the count of counter 74. Since the tone from oscillator 54 is no longer sent to the slave station S2, the tone detector 62 at slave station S2 will detect that the tone is no longer being received. When it does, it sends a signal to logic circuit 56 which causes gates 24 and 32 to connect demultiplexer 21 to decoder 26 and encoder 30 to multiplexer 34.

DETERMINATION OF $T_\phi$

The quantity $T_p$ need not be determined for every computation of $T_\phi$ since $T_p$ varies slowly with time. When a reading of $T_\phi$ is desired, the computer 14 sends via channel 22 to the station S2 an order to measure $T_\phi$. When an answer is sent back by the station S2 to the computer 14, in response to the aforesaid order, the computer 14 sends a signal to the logic circuit 46 through lead 45. At reception of this signal, the logic 46 drives branch gates 18 and 40 via leads 50 and 48, as well as gate 55, to connect oscillator 54 with multiplexer 20 and demultiplexer 38 to amplifier 52. At the same time, it resets counters 74 and 118 through lead 94. The tone signal is now sent to the station S2 through the gate 55, branch gate 18, multiplexer 20 and channel 22. At the same time, the order from computer 14 to the logic 46 causes logic circuit 46 to open or enable gate 70 at the next positive slope zero crossing of the 60-cycle voltage at the master station MS as determined by circuit 96. Circuit 96, of course, is the same as the circuits 66 and 68 previously described. Thus, gate 70 is again opened and counter 74 begins counting pulses from oscillator 72. This will continue until the next positive slope zero crossing of the tone signal (waveform B) is sensed by circuit 68, whereupon the logic circuit 46 disables gate 70, stopping the count of counter 74. This count, therefore, comprises the period $T_m$ shown in FIG. 2 which is the time between the consecutive positive slope zero crossings of the waveforms A and B.

At the slave station S2, once the confirmation order to measure $T_\phi$ is sent back to the computer 14, the instruction unit 28 sends a signal to the logic 56 via lead 51. At reception of this signal, the logic 56 drives branch gates 24 and 32 to connect demultiplexer 21 to amplifier 58 and amplifier 60 to multiplexer 34. At the same time it resets the counter 110 via lead 112.

When the tone sent by the master station MS is detected at station S2 by the tone detector 62, a signal from the tone detector, in combination with a signal from instruction unit 28, causes the logic circuit 56 to open gates 98 and 100 when the positive slope zero crossing of the 60-cycle alternating voltage at the slave station is sensed by zero crossing detector 102.

When the next positive slope zero crossing of the received tone signal is sensed by zero crossing detector 104, an output pulse is produced on lead 106; and this pulse is sent through the gate 98, amplifier 60 and channel 36, back to the master station MS. This pulse, as will be understood, corresponds to pulse $P_{rs}$ shown in FIG. 2. The pulse $P_{rs}$ also disables the gate circuit 100 through logic circuit 56. However, between receipt of a pulse from detector 102 and the pulse $P_{rs}$ from detector 104, pulses from a one megacycle oscillator 108 at the slave station S2 are fed to a counter 110. Consequentially, the output of the counter 110 is a number of pulses proportional to the quantity $T_s$ shown in FIG. 2. After receipt of the pulse $P_{rs}$, the logic circuit 56 sends a signal, via lead 59, to instruction unit 28 to read the count of counter 110. After a short delay, it causes branch gates 24 and 32 to connect demultiplexer 21 to decoder 26 and encoder 30 to multiplexer 34.

At master station MS, the pulse $P_{rm}$ generated by the send zero crossing detector 68 serves to enable a gate 116 through the logic circuit 46. Hence, at time $t_{rm}$, the gate 116 is enabled or opened to pass pulses from the oscillator 72 to counter 118. Counter 118 will continue to count until the pulse $P_{rs}$ is received back at the master station MS at time $t_{rs}$ shown in FIG. 2. This pulse, when received at master station MS and amplified by amplifier 52, causes the logic circuit 46 to disable gate 116. The logic circuit 46 registers which pulse, $P_{rs}$ or $P_{rm}$, occurs first and sends this information to the computer 14 through lead 49. When both gates 70 and 116 are disabled, the logic 46 sends a completion order to the computer 14 via lead 47 and causes gates 18 and 40 to connect encoder 16 to multiplexer 20 and demultiplexer 38 to decoder 42. At the same time it closes the gate 55.

At reception of completion signal, the computer 14 reads the counts of counters 74 and 118. At the same time it sends an order to station S2 via channel 22. At reception of the aforesaid order, the station S2 sends to the computer 14, via channel 36, the value of $T_s$, in the form of a binary coded number.

Hence, the computer 14 now has stored therein the quantities $T_m$, $T_s$ and $T_p$. Quantity $T_r$ is determined from the counts counted by counter 118 in accordance with the foregoing equation:

$$T_r = k(t_{rs} - t_{rm}) - T_p$$

and is rounded out by the computer 14 to the nearest full number of tone periods. A determination of whether K is plus or minus is made. As was mentioned above, this was given by the determination of whether $P_{rs}$ or $P_{rm}$ occurred first. This factor, as mentioned above, eliminates the inaccuracy due to a variable propagation time.

At this stage, therefore, the computer has stored therein the quantities $T_r$, $T_m$, $T_s$ and $T_p$. Since $\alpha$ is a known percentage, the computer can then solve the foregoing equation:

$$T_\phi = T_r + T_m - T_s + \alpha T_p$$

to determine the time $T_\phi$, corresponding to the phase angle difference between the 60-cycle alternating voltages at the master and slave stations MS and S2, respectively. Although positive slope zero crossings are used in the above explanation, it is obvious for those skilled in the art that the system can be designed to use negative slope zero crossings. The computer 14 may, for example, be a Prodac 50 (trademark) manufactured by Westinghouse Electric Corporation or an IBM 1401 (trademark) manufactured by International Business Machines Corporation, suitably programmed to electrically solve the foregoing equation and arrive at a value for $T_\phi$.

It is also evident that an alternate solution can be used which will always give a positive number for $T_r$ and eliminate the circuitry necessary to determine whether $P_{rs}$ or $P_{rm}$ occurs first. In this alternate embodiment, the slave station is programmed to send back two pulses $P_{rs}$, corresponding to two consecutive measurements of time $T_s$. At master station, the gate 116 is open during a period defined by $P_{rm}$ and the first pulse $P_{rs}$ received after $P_{rm}$.

Although the invention has been shown in connection with a certain specific embodiment, it will be readily apparent to those skilled in the art that various changes in form and arrangement of parts may be made to suit requirements without departing from the spirit and scope of the invention.

We claim as our invention:
1. In apparatus for determining the time $T_\phi$, corresponding to the difference in phase angle $\phi$ between alternating voltages at two spaced stations in a power distribution network by means of a tone signal transmitted from the first station to the second station and returned back to the first state; the combination of means including a pulse generator for producing a first electrical signal $T_r$ the magnitude of which is proportional to a full number of cycles of said tone signal, means including an oscillator for producing a second electrical signal $T_m$ the magnitude of which is proportional to the time between consecutive specified polarity slope zero crossings of the alternating voltage and a transmitted tone signal at said first station, means including a counter for producing a third electrical signal $T_s$ the magnitude of which is proportional to the time between consecutive ones of said specified polarity slope zero crossings of the alternating voltage and a received tone signal at said second station, means including an oscillator and a counter for producing a fourth electrical signal $T_p$ the magnitude of which is proportional to the propagation time of the tone signal from the first to the second station, and computer means responsive to said first, second, third and fourth signals for determining the time $T_\phi$ corresponding to the magnitude of the phase angle $\phi$ in accordance with the equation:

$$T_\phi = T_r + T_m - T_s + \alpha T_p$$

2. The combination of claim 1 wherein the specified polarity slope zero crossings of the alternating voltage and the tone signal comprise positive slope zero crossings.

3. The combination of claim 1 wherein the first, second, third and fourth electrical signals comprise digital signals and said computer means comprises a digital computer.

4. The combination of claim 2 wherein the computer means is located at said first station, the digital signals $T_m$, $T_r$ and $T_p$ are generated at said first station, and the digital signal $T_s$ is generated at said second station and transmitted back to the first station.

5. The combination of claim 1 wherein the quantity $T_p$ is proportional to the total time required for a tone signal to be transmitted from the first station to the second station and then back to the first station, and the quantity $\alpha$ comprises a fraction less than one.

6. The combination of claim 1 wherein the means for producing the signal $T_r$ comprises a pulse generator at said second station for producing a pulse upon the first said specified polarity slope zero crossing of the received tone signal following a said specified polarity slope zero crossing of alternating voltage at the second station, means for transmitting said pulse back to said first station, a counter at said first station, means for applying pulses to be counted to said counter between the first said specified polarity slope zero crossing of the transmitted tone signal following a said specified polarity slope zero crossing of alternating voltage at the first station and receipt at the first station of said pulse transmitted from the second station, means for subtracting from the count of said counter the quantity $T_p$, and means in said computer means for rounding out the quantity resulting from the aforesaid subtraction to a whole number of tone periods to derive $T_r$.

7. The combination of claim 1 wherein the means for producing the signal $T_m$ comprises an oscillator, a counter, a gate circuit for controlling the infeed of pulses from the oscillator to the counter, means for enabling said gate circuit to pass pulses to the counter upon the occurrence of a said specified polarity slope zero crossing of alternating voltage at said one station, and means for disabling said gate circuit upon the occurrence of the next said specified polarity slope zero crossing of the transmitted tone signal at said one station.

8. The combination of claim 1 wherein the quantity $T_p$ is equal to a whole number of periods of the tone signal plus the time between consecutive said specified polarity slope zero crossings of the transmitted and received tone signals at said one station.

References Cited

UNITED STATES PATENTS

| | | | |
|---|---|---|---|
| 3,114,037 | 12/1963 | Brownlee | 235—151.2 X |
| 3,229,110 | 1/1966 | Kleinbach et al. | 235—151.21 |
| 3,244,898 | 4/1966 | Hickox. | |
| 3,270,209 | 8/1966 | Cohn | 235—151.21 X |
| 3,387,121 | 4/1968 | Maczuzak et al. | 235—151.21 |

MALCOLM A. MORRISON, Primary Examiner

J. F. RUGGIERO, Assistant Examiner

U.S. Cl. X.R.

235—150.21

PO-1050
(5/69)

UNITED STATES PATENT OFFICE
CERTIFICATE OF CORRECTION

Patent No. 3,469,082    Dated September 23, 1969

Inventor(s) Francis T. Thompson and Andre Wavre

It is certified that error appears in the above-identified patent and that said Letters Patent are hereby corrected as shown below:

Claim 1, column 8, line 74, the word "state" should read -- station --.

Claim 1, column 9, line 13, the character "$T_p$" should read -- $\alpha\, T_p$ --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents